Figure 1:
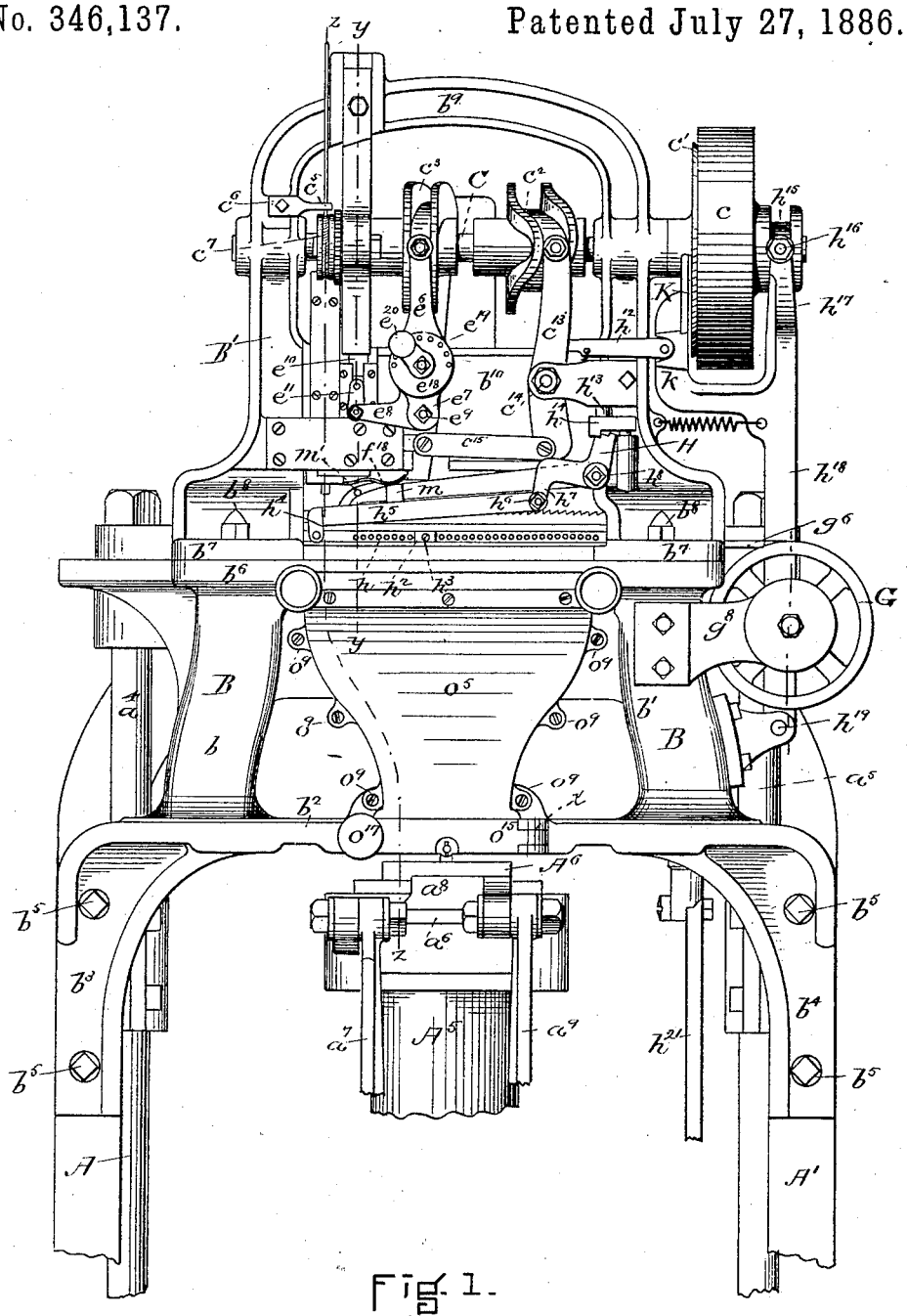

(No Model.) 8 Sheets—Sheet 1.

A. O. TOWNS & F. F. RAYMOND, 2d.
NAIL MAKING AND DISTRIBUTING MACHINE.

No. 346,137. Patented July 27, 1886.

WITNESSES

INVENTOR (No Model.) 8 Sheets—Sheet 2.
A. O. TOWNS & F. F. RAYMOND, 2d.
NAIL MAKING AND DISTRIBUTING MACHINE.
No. 346,137. Patented July 27, 1886.
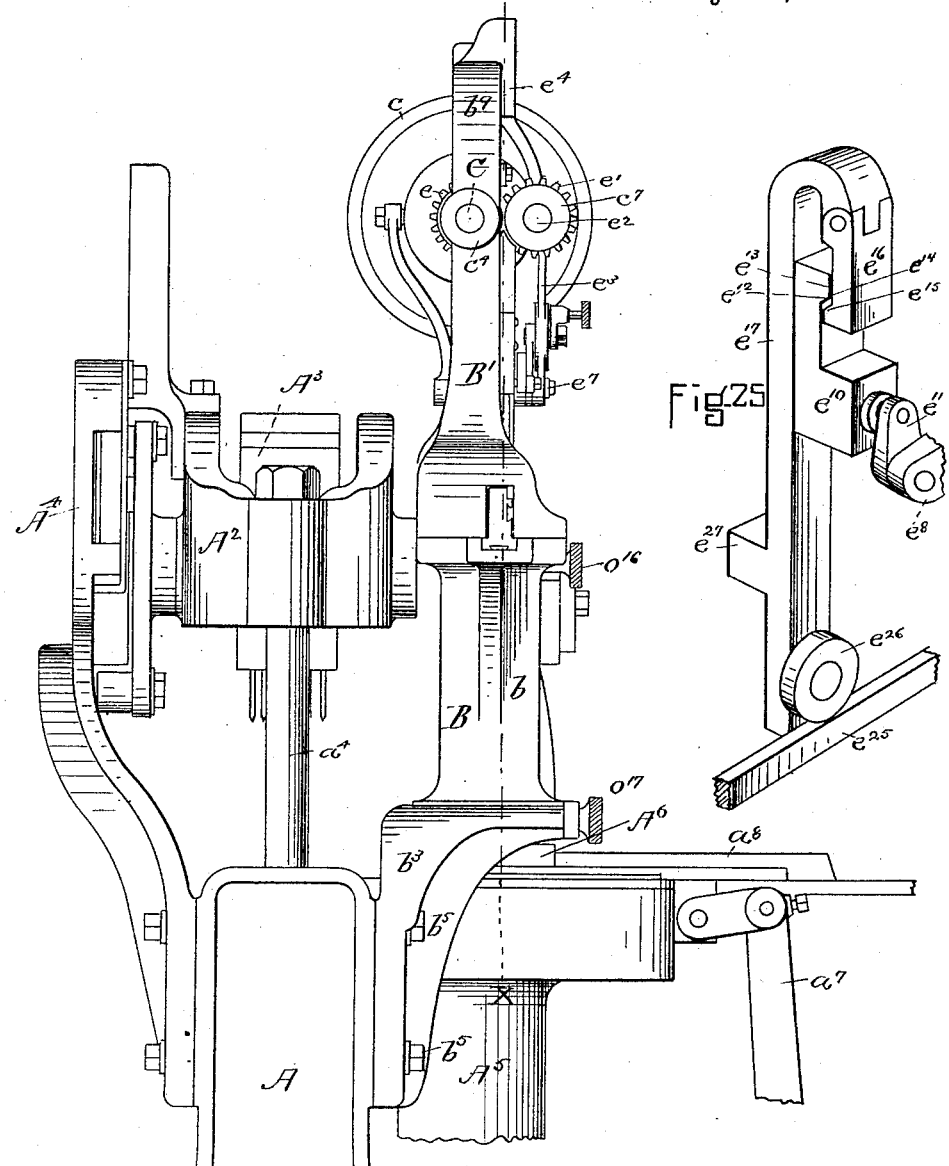
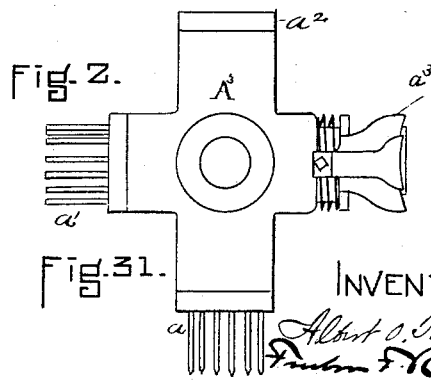
WITNESSES
INVENTOR

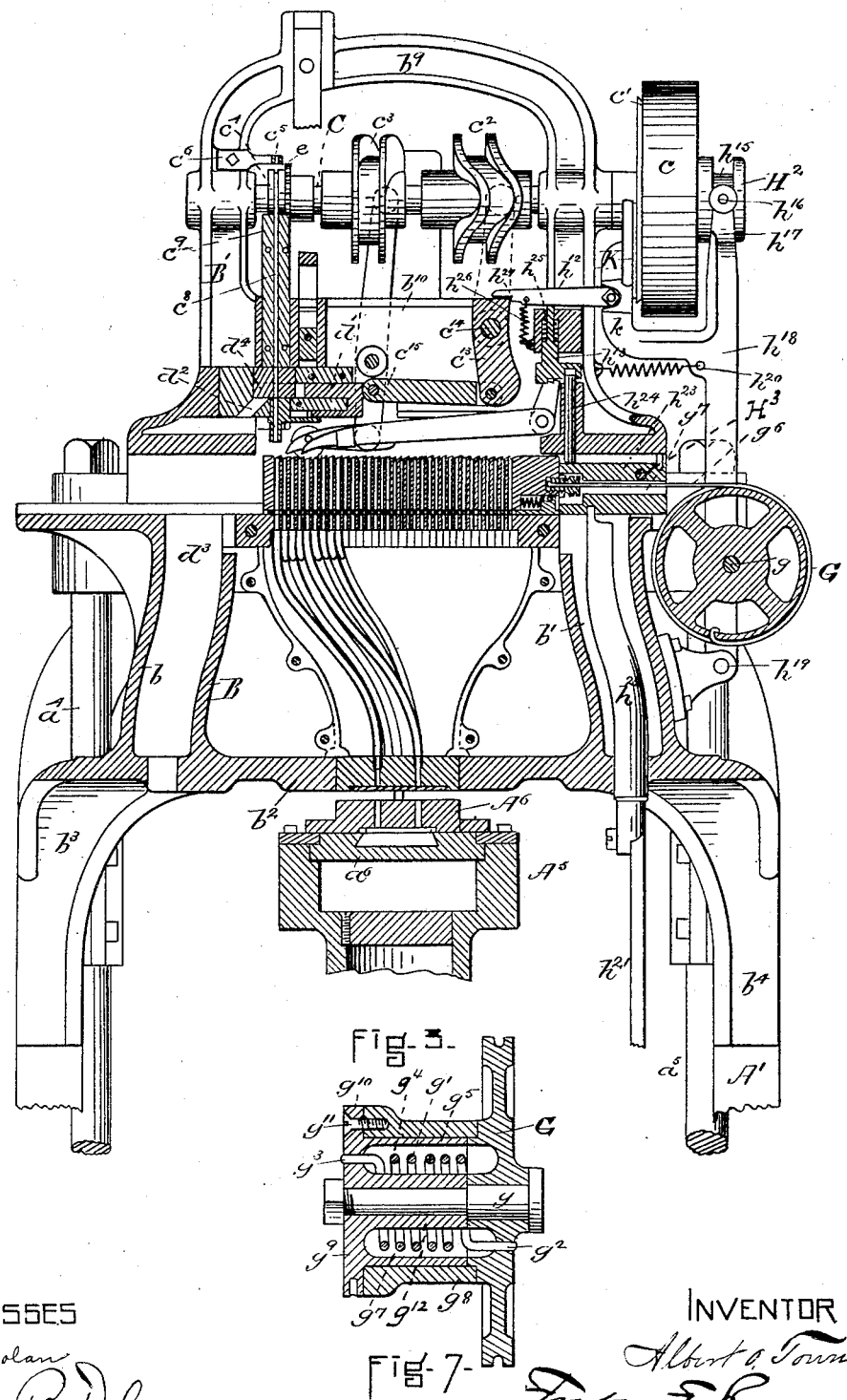

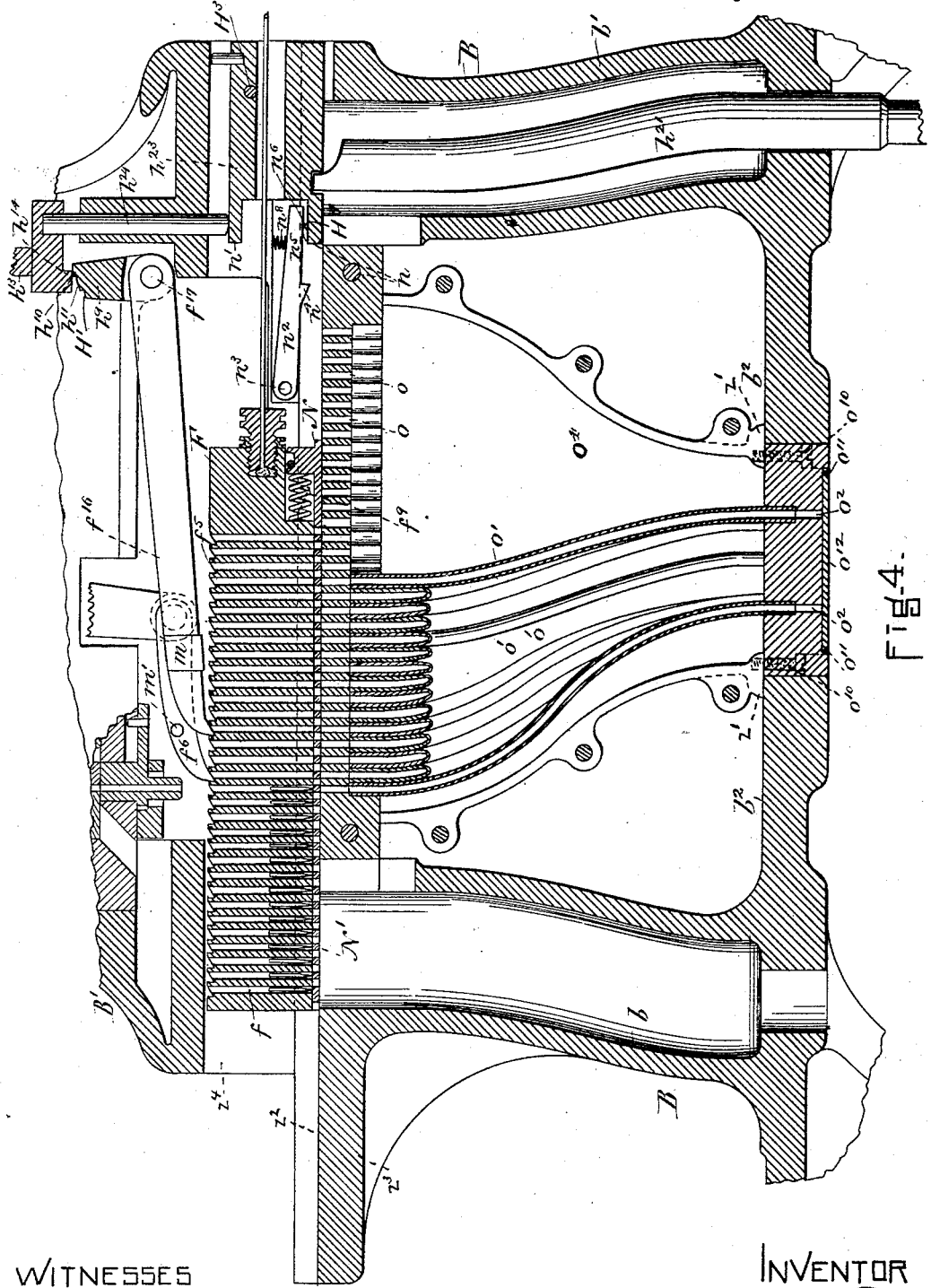

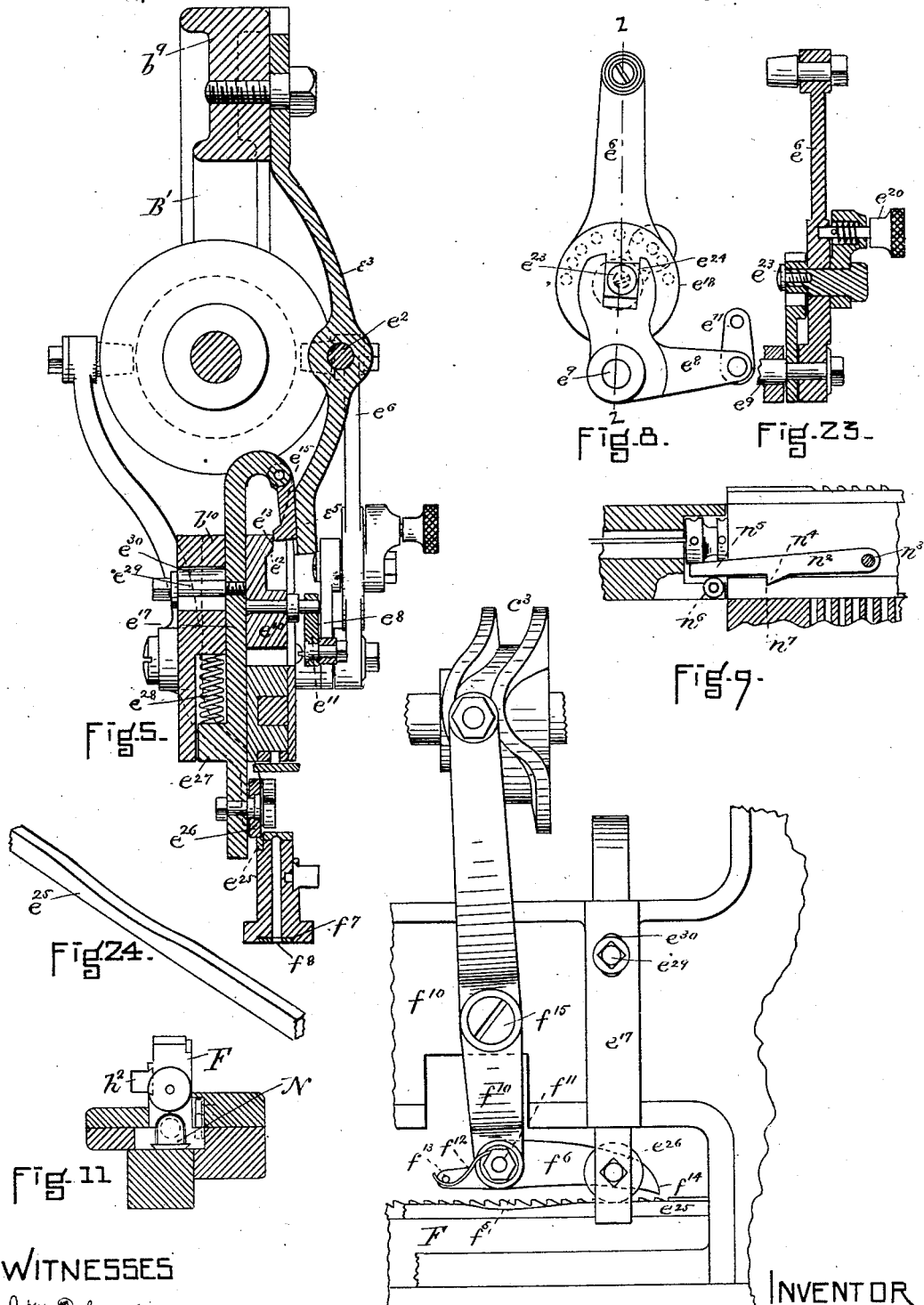

(No Model.) 8 Sheets—Sheet 6.
A. O. TOWNS & F. F. RAYMOND, 2d.
NAIL MAKING AND DISTRIBUTING MACHINE.
No. 346,137. Patented July 27, 1886.
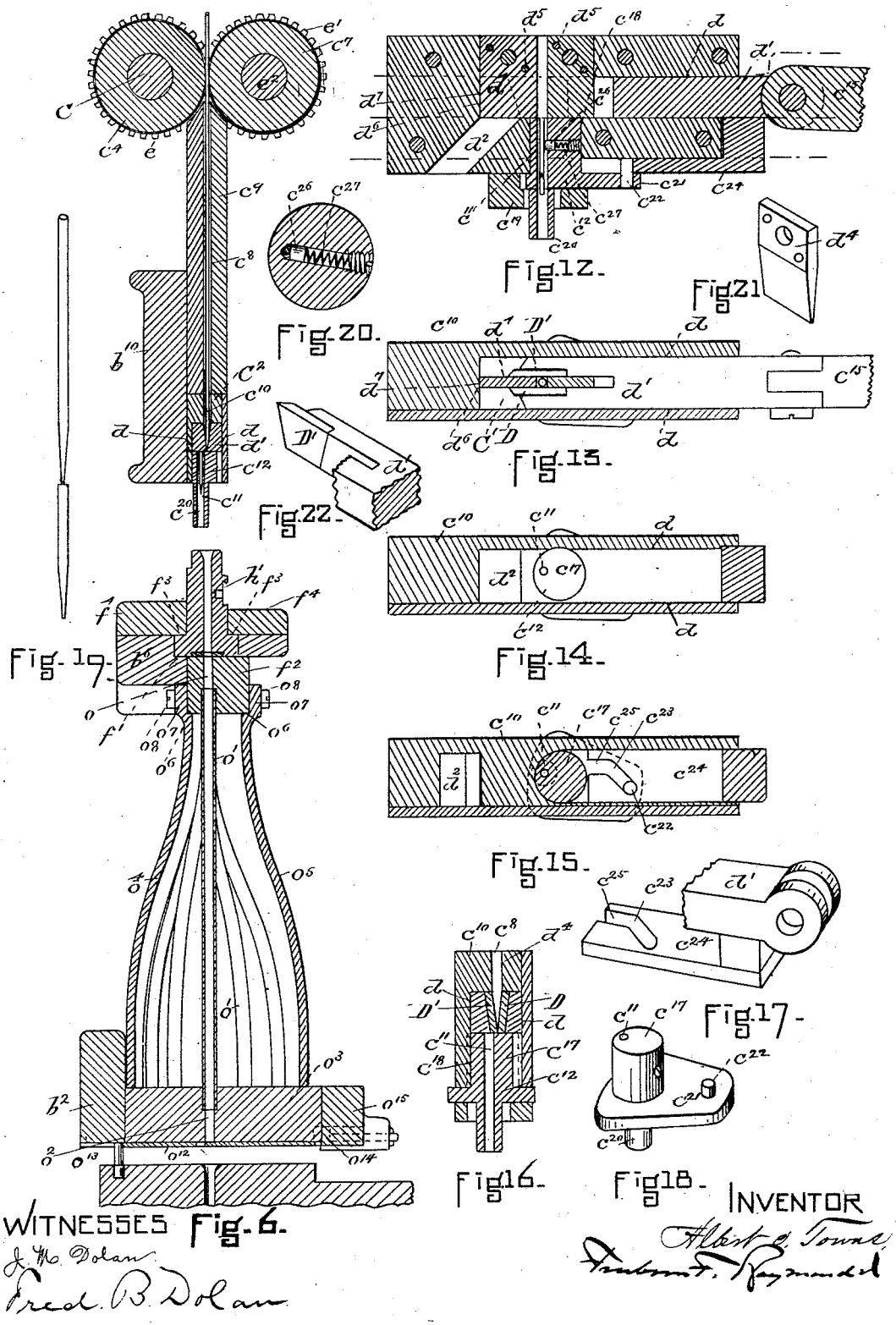
WITNESSES
J. M. Dolan
Fred. B. Dolan
INVENTOR
Albert O. Towns
Frederick F. Raymond (No Model.) 8 Sheets—Sheet 7.
A. O. TOWNS & F. F. RAYMOND, 2d.
NAIL MAKING AND DISTRIBUTING MACHINE.
No. 346,137. Patented July 27, 1886.
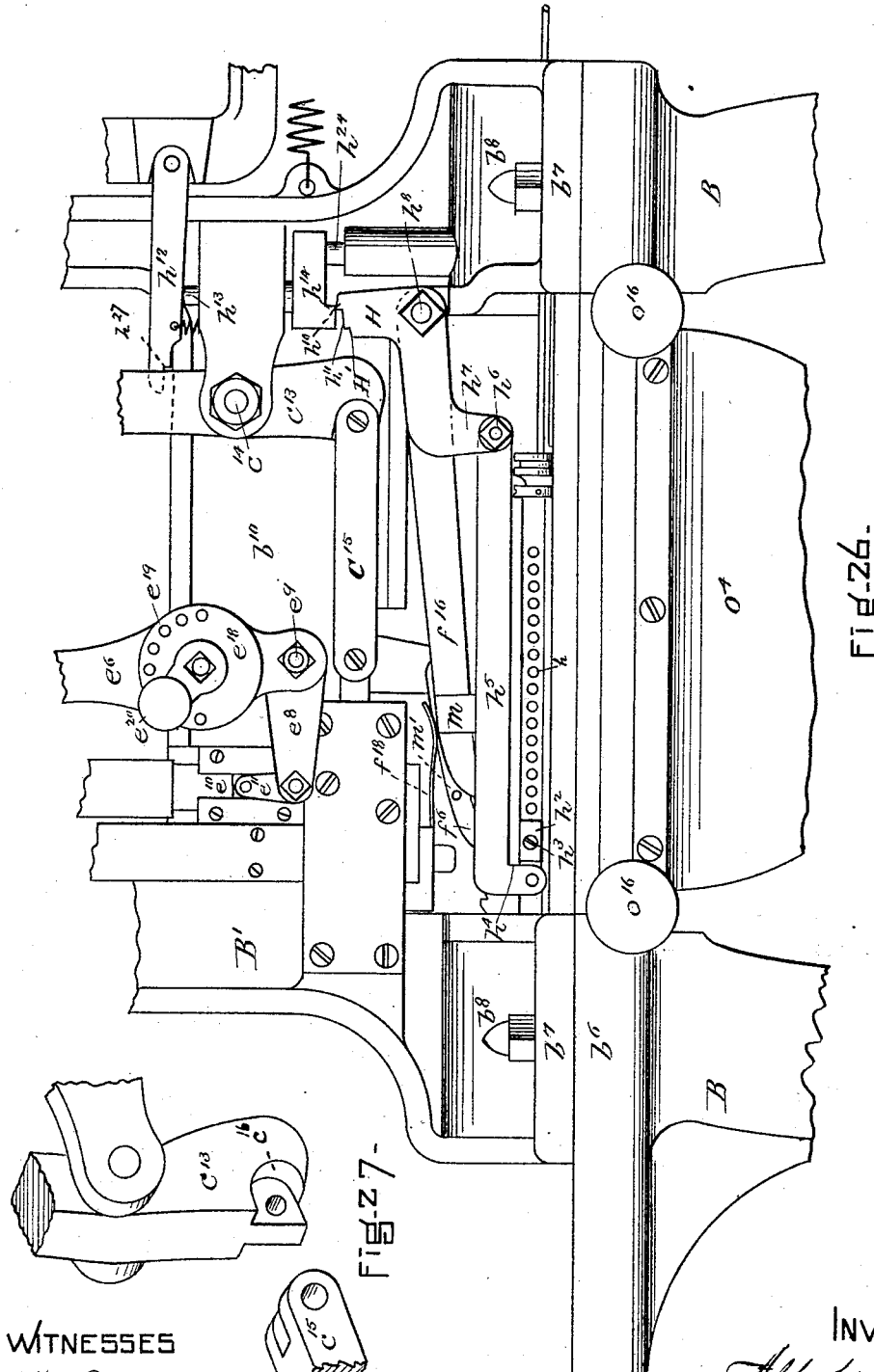
WITNESSES
INVENTOR (No Model.) 8 Sheets—Sheet 8.

A. O. TOWNS & F. F. RAYMOND, 2d.
NAIL MAKING AND DISTRIBUTING MACHINE.

No. 346,137. Patented July 27, 1886.

WITNESSES
INVENTOR

UNITED STATES PATENT OFFICE.

ALBERT O. TOWNS, OF BOSTON, AND FREEBORN F. RAYMOND, 2D, OF NEWTON, MASSACHUSETTS; SAID ALBERT O. TOWNS ASSIGNOR TO SAID FREEBORN F. RAYMOND, 2D.

NAIL MAKING AND DISTRIBUTING MACHINE.

SPECIFICATION forming part of Letters Patent No. 346,137, dated July 27, 1886.

Application filed November 27, 1885. Serial No. 184,048. (No model.)

*To all whom it may concern:*

Be it known that we, ALBERT O. TOWNS, of Boston, in the county of Suffolk, and FREEBORN F. RAYMOND, 2d, of Newton, in the county of Middlesex, both in the State of Massachusetts, citizens of the United States, have invented a new and useful Improvement in Nail Making and Distributing Machines, of which the following is a full, clear, and exact description, reference being had to the accompanying drawings, forming a part of this specification, in explaining its nature.

The object of the invention is to provide means for automatically making nails of any desired length, or of varying lengths, in succession, for automatically delivering them in gangs or groups in any form or arrangement, and for automatically starting and stopping the machine; and the invention comprises devices for making nails from wire, for receiving them, and for distributing them in any desired form or arrangement for driving; also, mechanism for varying the length of the nails, adapted to be adjusted before the machine is started, and mechanism for automatically varying the length of the nails while the machine is in operation.

It further comprises a nail receiver and distributer of peculiar construction, and means for starting and stopping the machine automatically at any predetermined interval, or when any predetermined number of nails have been made.

It further relates to various details of construction, all of which will hereinafter be more fully described.

In the drawings the invention is represented as applied to a heel-nailing machine; but we would not be understood as limiting ourselves to its use in connection with such a machine.

Figure 28:
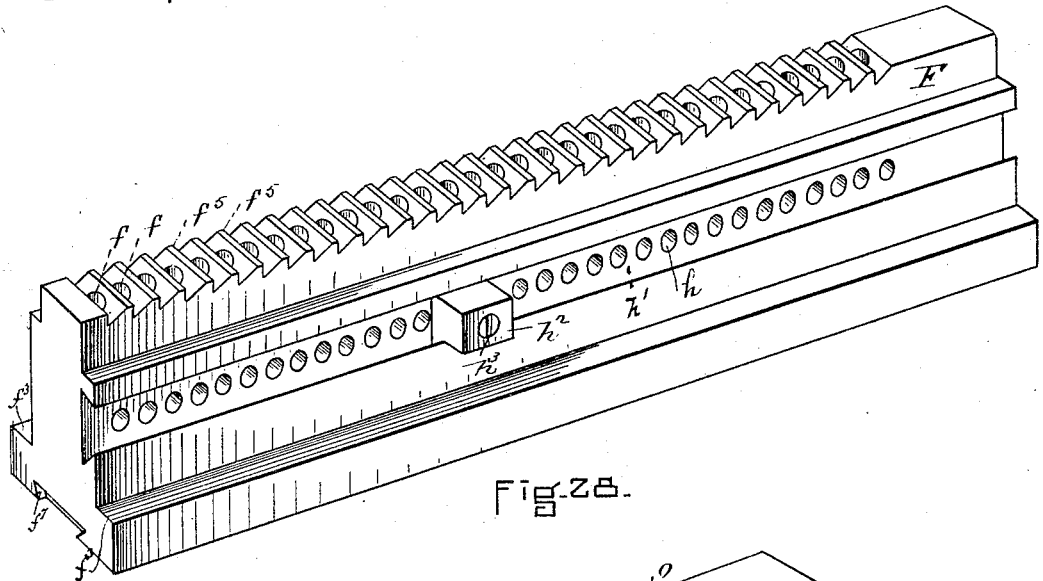
Figure 29:
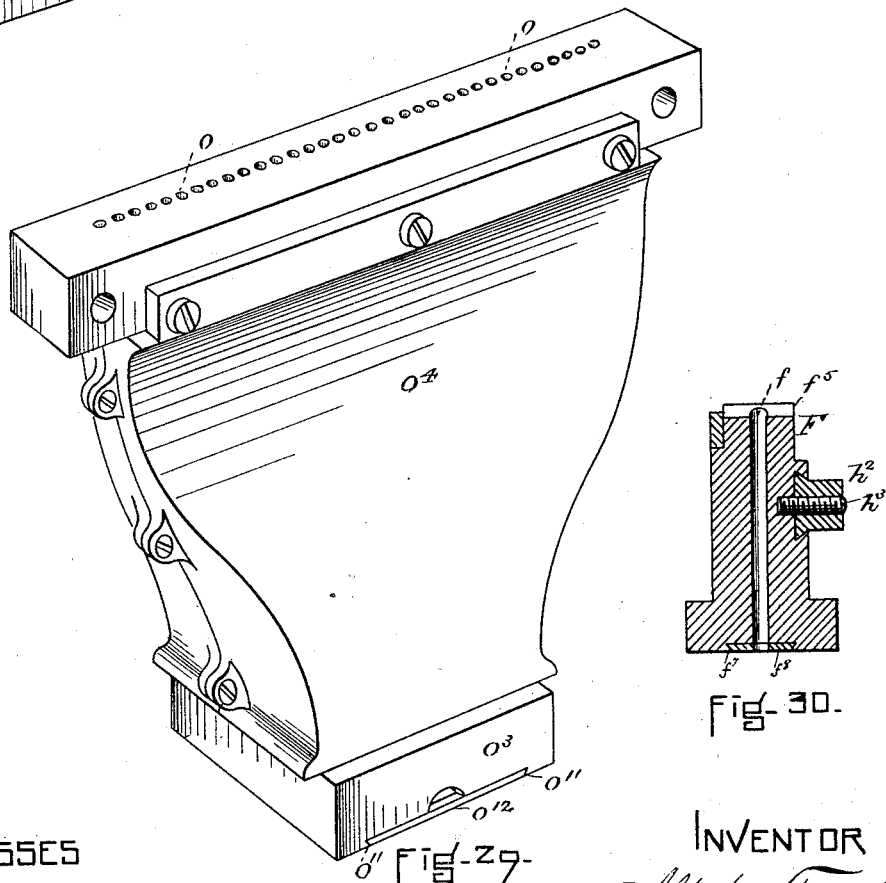
Figure 30:
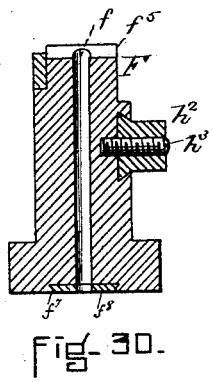

Figure 1 represents in rear elevation a portion of a heel-nailing machine with our nail making and distributing machine attached thereto. Fig. 2 is a side elevation at the left hand of the elevation represented in Fig. 1, and of the parts therein shown. Fig. 3 is a vertical section upon the dotted line $x\ x$ of Fig. 2. Fig. 4 is an enlarged view, in vertical section, of the lower portion of the nail making and distributing machine or devices shown in Fig. 3. Fig. 5 is a vertical section upon the line $y\ y$ of Fig. 1. Fig. 6 is a vertical section upon the line $z\ z$ of Fig. 1. Figs. 7, 8, 9, 10, 11, 12, 13, 14, 15, 16, 17, and 18 are views in detail of various parts of the mechanism, reference to which will hereinafter be made. Fig. 19 is a view illustrating the operation of the cutting devices upon the wire from which the nail is made. Fig. 20 is a horizontal section illustrating the device for holding the severed nail in the throat of the machine. Fig. 21 is a perspective view of a die-block hereinafter described. Fig. 22 illustrates in perspective one of the cutters and a portion of its holding-block. Fig. 23 is a vertical section upon the line $z\ z$ of Fig. 8. Fig. 24 is a perspective view of a cam or pattern for automatically varying the operation of the feeding mechanism. Fig. 25 is a perspective view of a portion of the wire feeding and operating mechanism. Fig. 26 is an enlarged view in front elevation of various parts of the nail making and distributing devices, reference to which is hereinafter made. Fig. 27 represents in perspective a detail view of a portion of the cutter-block, link, and lever for operating the same. Fig. 28 is a perspective view of the nail receiving and delivery block. Fig. 29 is a perspective view of the nail-distributer. Fig. 30 is a section through the nail receiving and delivery block. Fig. 31 is an elevation of the revolving head detached.

A A' represent portions of the frame of a heel-nailing machine like that described in the Henderson patent, No. 316,894.

$A^2$ is the cross-head of the heel-nailing machine which carries a revolving head, $A^3$, supporting a gang or group of awls, $a$, a gang or group of drivers, $a'$, a top-lift spanker, $a^2$, which may also have a top-lift holding device attached, if desired, and a heel-breasting knife or device, $a^3$. The revolving head is automatically revolved to bring the awls and drivers and heel-breasting device successively into operative position in any desirable way, and we have represented in the drawings the mechanism shown and described in the Henderson and Raymond patent, No. 317,647, dated May 12, 1885. It is marked $A^4$ upon the drawings, and a further description thereof is unnecessary.

The cross-head $A^2$ is mounted upon rods $a^4$ $a^5$, which connect it with a lower cross-head, and the mechanism for reciprocating it. (Not shown.)

$A^5$ is the vertically-movable post or table of the heel-nailing machine, which carries or supports the templet-plate $a^6$, having at its front end a templet and adapted to be automatically reciprocated by the lever $a^7$ and a cam. (Not shown.) The table or post $A^5$ also carries or supports the nail-carrier plate $a^8$, which has at its front end the nail-holder $A^6$. This nail-carrier plate is also automatically reciprocated at predetermined intervals by means of the lever $a^9$, operated by a cam. (Not shown.)

For fuller information concerning the construction and operation of these parts reference is made to patent to Raymond, No. 290,109, dated December 11, 1883.

B represents the lower section of the frame of the nail making and distributing machine. It comprises the posts $b\ b'$, the lower cross-plate, $b^2$, the brackets $b^3\ b^4$, whereby by means of the bolts $b^5$ it is secured to the frame of the heel-nailing machine, and the upper cross-plate, $b^6$, which connects the upper ends of the posts $b\ b'$.

B' is the upper section of the frame. It has the base-plate $b^7$ and lower section of the frame to be secured thereto by the bolts $b^8$. It also has the arched portion $b^9$ and a cross piece or plate, $b^{10}$. The lower section, B, of the frame supports most of the nail delivery and distributing devices, and the upper section, B', the nail-making devices.

C is the main shaft of the machine. It has at one end the movable member $c$ of a pulley-clutch and the fixed or fast member $c'$, and it carries or supports the cylinder-cam $c^2$, which operates the cutters and the stop motion, as hereinafter described, and the cylinder-cam $c^3$, for operating the devices for varying the extent of the wire-feed and the devices for moving the nail receiving and delivery block. The shaft C also carries or supports the positively-revolved feed-roll $c^4$ at its forward end. The shaft C has suitable bearings in the upper section, B', of the frame.

The wire from which the nails are made is led from a reel, suitably located in relation to the machine, through straightening devices (not shown) through the guide-hole $c^5$, which is arranged immediately over the feed-rolls, and is formed in the end of an arm or bracket, $c^6$, extending inward from the frame B', and it passes between the feed-roll $c^4$ which has a groove formed therein, and the horizontally-movable feed-roll $c^7$, which also has a groove formed in its periphery, (see Fig. 6,) and the wire is advanced or fed by these rolls, as hereinafter specified, through the feedway $c^8$ in the block $c^9$, which feedway may be of any desired shape in cross-section to correspond to the shape of the wire to the cutters D D', (see Fig. 13,) which are fastened to the block $d'$, arranged to be moved horizontally in the ways $d$ across the line of the feedway $c^8$, which extends through the block $c^{10}$ above the cutters into the throat $c^{11}$ in the block $c^{12}$ below the cutters. The block $c^{10}$ is bolted to the plate $b^{10}$ of the frame of the machine, and the cutters D D' are reciprocated horizontally in the recess therein by means of the cylinder-cam $c^2$, the lever $c^{13}$, pivoted at $c^{14}$, and the link $c^{15}$, connected by a pivot with the lower end of the lever $c^{13}$, and with the block $d'$, carrying or supporting the cutters D D'. The lever $c^{13}$ is preferably shaped as represented in Fig. 27, and has a recess or cavity, $c^{16}$, which receives and holds the end of the link $c^{15}$, so as to provide an abutment or shoulder against which the said end shall bear for re-enforcing the pivot to prevent all strain coming on the pivot. The cam $c^2$ is timed so that the cutters D D' are moved back from the feedway $c^8$ during the operation of the feed-rolls in feeding the wire. The space C' in the block $c^{10}$, within which the cutters reciprocate, extends or opens into the inclined passage $d^2$, which in turn opens into the escape-passage $d^3$, being the cavity of the post $b$. The block $c^{10}$ supports the V-shaped plates $d^4$. (Shown in Figs. 12, 13, and 21.) These pieces are arranged to form a hole in continuation of the feedway $c^8$, and they also have holes $d^5$ for the reception of the dowel-pins extending from the block $c^{10}$, and fastening-screws which secure it and its holding-block $C^2$ to the block $c^{10}$. The plates project downward from the upper portion of the block $c^{10}$ into the space in which the cutters D D' reciprocate, and their lower edge rests upon the upper surface of the lower part of the block $c^{10}$, and the edge $d^6$ of one bears against the shoulder $d^7$. (See Figs. 12 and 13.) The cutters D D' are arranged upon their holding-block so that one reciprocates upon one side of these plates $d^4$ and the other upon the other side thereof, and the wire, when in position for the operation of the cutters, will have the sections which are to be removed therefrom in pointing the nail extending beyond the two side surfaces of the plate, so that upon the movement of the cutters the portions which so project are cut off or severed from the wire, and by the continued forward movement of the cutters carried to the passage $d^2$ through which they escape. The cutters may have any desired edge configuration, and in Fig. 22 we have represented the cutting-edges as inclined from their upper edge downward and inward, or so that the cutters first begin to operate upon the upper line of the cut.

In the operation of this machine the end of the wire is pointed before the nail is severed, so that the first operation of the cutters is to point the wire. The wire is then fed downward and the second operation of the cutters either points the second nail and at the same time severs the first nail from the end of the wire, or the cutters may be arranged to remove sections of the wire and form the point, without, however, entirely severing the nail from the end of the wire, leaving a narrow connecting-section, substantially as represented in Fig. 19. When the cutters are thus shaped, it is necessary to use an additional device for severing the nail from the end of the wire, and we have represented for accomplishing this purpose the block $c^{12}$ as provided with a slight lateral movement so as to move the nail held in the throat $c^{11}$ horizontally in relation to the remainder of the wire. To accomplish this, the block $c^{12}$ is provided with a post, $c^{17}$, which extends into a hole, $c^{18}$, in the lower part or section of the block $c^{10}$, and the throat $c^{11}$ is arranged in the post midway between its center and outer edge, so that a slight revolving movement of the post moves the throat out of line with the feedway. The block $c^{12}$ is supported by the plate or bracket $c^{19}$, (see Fig. 12,) and it has the nozzle $c^{20}$ and the backward-extending arm $c^{21}$. The construction of this block is well represented in perspective in Fig. 18. Arranged to extend from the upper surface of the arm $c^{21}$ is the pin $c^{22}$, which enters the cam-slot $c^{23}$ in the plate $c^{24}$, fastened to or forming a part of the cutter-holding block $d'$. This cam-groove is so arranged that the block $c^{12}$ is not turned until the cutters D D' have operated to point the wire, but immediately after their cutting-edges have passed the wire, and during their continued forward movement, the cam-slot being moved horizontally with the cutter-block, immediately operates to turn or revolve the block $c^{12}$, thereby moving the throat out of register with the feedway, and completing the severing of the nail by moving the nail therein laterally in relation to the wire; and upon the reverse movement of the cutters, and before they have cleared the wire the block is turned back and the throat again brought in line with the feedway and held locked by the straight portion $c^{25}$ of the cam-slot. The wire, it will be observed, is held in part during the turning of the block $c^{12}$ by the plate $d^4$ and the inner surfaces of the two cutters D D'; and it will be seen that the lower side edge of the cutter D' acts as a shear in connection with the edge of the throat in the post $c^{17}$. We have also represented the throat $c^{11}$ as provided with a nail-holding device, and it comprises a movable pin or holder, $c^{26}$, having a groove in its outer end, and arranged to be pushed into the throat $c^{11}$ automatically by means of a spring, $c^{27}$, held in a hole extending laterally from the throat. It will be seen that upon the downward movement of the wire the spring pin or block is pushed from the throat sufficiently to permit the end of the wire to pass, and that it then returns and continues to bear automatically against the side of the wire or nail, so that after the severing of the nail it acts to hold the nail in the throat by pressing it against the side thereof until the nail is removed therefrom. This holding pin or block must be located near the upper end of this throat in order to hold nails of all lengths. The nail having been severed from the end of the wire and the wire pointed, the next downward movement of the wire will of course force the nail from the throat, when it is received by the receiving and delivery block hereinafter described. It is obvious, of course, that the feed-rolls $c^4$ $c^7$ must only operate to feed the wire during a portion only of the revolution of the shaft C, and that at all other times the wire must be stationary. For this purpose it is necessary to close and open the feed-rolls at predetermined intervals; and this we prefer to accomplish in the following manner: The feed-roll $c^4$ has a gear, $e$, which is continuously revolved by the shaft C, and which is arranged to mesh with the gear $e'$ on the stud $e^2$ of the feed-roll $c^7$. This stud is mounted upon a spring-arm, $e^3$, which is fastened at its upper end, $e^4$, to the frame $b^9$ of the machine, and its lower end, $e^5$, is arranged to be moved horizontally at predetermined intervals to engage and disengage the gear $e'$ with or from the gear $e$. The time of the engagement and disengagement is determined by the cam $c^3$ operating through the lever $e^6$, pivoted at $e^7$, and the bent lever $e^8$, pivoted at $e^9$. This bent lever $e^8$ is connected with a sliding block, $e^{10}$, by the link $e^{11}$. The block has suitable bearings in the plate $b^{10}$, and is shaped to provide the inclined $e^{12}$ and the vertical surface $e^{13}$. This block is reciprocated at proper intervals, and the wedge or inclined surface and the straight surface are brought into contact with the opposing straight surface $e^{14}$ and incline $e^{15}$ upon the block $e^{16}$, hinged to the bar $e^{17}$. (See Fig. 25.) This block $e^{16}$ is arranged between the reciprocating block $e^{10}$ and the inner surface of the lower part, $e^5$, of the lever $e^3$, carrying the feed-roll $c^7$, and as it is moved or swung laterally by the vertical movement of the block $e^{10}$ it causes the lever $e^3$ to be moved laterally, and therefore the feed-roll that it carries, so that the gear attached to the roll is moved out of gear when the two surfaces $e^{13}$ and $e^{14}$ are in contact, and is moved into gear by the force of the spring $e^3$ when they are not in contact. It will be seen that by varying the time that the gear $e'$ is held in mesh with the gear $e$ the extent of the feed of the wire is varied, and that when the interval of engagement is short a less length of wire is fed than when it is longer; and we have arranged to vary the length of the time in which these gears are held in mesh by an adjusting device arranged to vary the position of the bent lever $e^8$ at the beginning of its operation. This adjusting device comprises the disk $e^{18}$, having a number of holes, $e^{19}$, and which forms a part of the lever $e^6$, and an arm or handle, $e^{20}$, pivoted centrally to the disk by the pivot $e^{21}$, has spring-pin $e^{22}$ adapted to engage the holes $e^{19}$, and also the eccentric stud $e^{23}$, which enters the recess $e^{24}$ in the upper end of the bent lever $e^8$, so that upon the movement of the arm or handle $e^{20}$ the bent lever is moved upon its fulcrum $e^9$ in one direction or the other according as the handle is turned, and this movement of the handle either causes the end of the bent lever which takes hold of the link to be lifted or depressed before the machine is put in operation. It will be seen that this movement of the bent lever $e^8$ determines how high the block $e^{10}$ shall move, and consequently the time of contact of the block with the block $e^{16}$ and the end of the spring $e^3$; consequently, if it is desired to form short nails the handle $e^{20}$ is turned to the left, the first hole in the disk $e^{18}$ indicating the shortest nail that can be made. To increase the length of the nail, it is only necessary to turn this handle, before starting the machine, to the right, and the longest nail is made when the handle is turned to engage the spring-pin with the last hole to the right.

It is desirable not only that means be provided for varying the length of the nail adapted to be operated before the machine is started, and to then operate to produce a nail of a uniform length, but that means be also provided for automatically varying the length of the nail as the machine is in operation, whereby the pointing, severing, and delivery of a nail of one length may be immediately followed by the pointing, severing, and delivery of another nail of a different length; and the mechanism for accomplishing this comprises a pattern or cam, $e^{25}$, adapted to be horizontally moved during the operation of the machine, and the bar $e^{17}$ is moved vertically by this cam, and therefore varies the position of the hinged block $e^{16}$ in relation to the reciprocating block $e^{10}$, so that the time of contact of the opposing surfaces of these blocks is automatically varied or controlled by the cam or pattern.

In Figs. 5 and 25 we have represented the bar $e^{17}$ as having an anti-friction roll, $e^{26}$, which bears upon the cam surface or pattern $e^{25}$, and also as having a shoulder, $e^{27}$, against which the coiled spring $e^{28}$ acts to force or hold the plate or roll thereon in contact with the cam. The plate or bar is represented as secured in place by the post $e^{29}$, which passes through a slot, $e^{30}$, in the frame of the machine.

The operation of this part of the device is as follows: The devices for regulating the length of the nail having been set to make any desired length, upon the movement of the cam surface or pattern past the end of the adjusting bar or plate $e^{17}$ the position of the block $e^{16}$, which is operated by the levers $e^6$ $e^8$ through block $e^{10}$, is varied—that is, it is lifted or lowered according as the cam or pattern determines, and this lifting or lowering of the block causes a corresponding difference in the time that the feed-roll arm is held off in disengaging the feed-roll gear $e'$; so that the block operated by the cam $c^3$ and levers $e^6$ $c^8$ is dependent upon the position to which the block $e^{16}$ is moved by the cam or pattern $e^{25}$ in determining the length of the nail.

We have now described the various devices for feeding the wire, pointing it, severing the nail, removing or delivering the nail from the throat, for varying the length of the nail, and for automatically changing the length while the machine is in operation. We shall now describe the delivering and distributing mechanism, and the mechanism for starting the machine automatically, and for automatically stopping it upon the making of a predetermined number of nails.

We have illustrated the machine as used in connection with a heel-nailing machine, and therefore the distributer is arranged to distribute the nails in an arrangement for delivery to the carrier of the heel-nailing machine; and this arrangement is in substance, in the form of an oblate spheroid with one end cut off. The distributing devices comprise two essential parts—first, the part which we call the "receiving and delivery block," which receives the nails one by one as they are delivered from the throat of the nail-making device, and, second, the nail-distributer which receives the nails from the nail-delivery block and conducts them by means of passages to a block or receptable arranged to receive and hold them for delivery or driving. The nail receiving and delivery block F is well shown in Figs. 1, 3, 4, 28, and 30, and it comprises a long substantially rectangular-shaped piece of metal or structure having vertical holes $f$ arranged therein at uniform distances apart. The block is arranged to slide or move horizontally upon the surface $f'$ of the upper cross-plate, $b^6$, of the frame, and the upper surface of the block $f^2$, which forms a part of the nail-distributer. The block F is provided with the shoulders $f^3$, (see Figs. 6 and 28,) upon which the cap-plates $f^4$ project. The upper surface of the block is provided with the teeth $f^5$, one for every hole, and by means of which and the feed-pawl $f^6$ the block is fed or moved to receive nails from the throat of the nail-making device. The block has also extending inward from its under surface a dovetail recess, $f^7$, which receives or holds a sliding perforated plate, $f^8$, which is automatically moved to close the holes immediately before the beginning of the forward movement of the nail-carrier block F by the spring $f^9$. (See Fig. 4.) The feed-pawl $f^6$ is supported at the end of the lever $f^{10}$, to which it is pivoted at $f^{11}$, and a spring, $f^{12}$, bears against its end $f^{13}$, and serves to keep its point $f^{14}$ depressed. The lever $f^{10}$ is pivoted at $f^{15}$, and is operated to reciprocate the pawl by means of the cam $c^3$. The time of the cam is such that the pawl is operated to move the block F immediately after the delivery of a nail from the throat to one hole therein to bring the next succeeding hole in the block in register with the throat. It is of course necessary to hold the block in this position while the feed-pawl is being returned to engage with the next tooth in order; and in order to accomplish this we employ a detent-pawl, $f^{16}$, which is pivoted at $f^{17}$, and which, preferably, is held down by the spring $f^{18}$. This detent-pawl serves to hold the receiving and delivery block in place while the feed-pawl $f^6$ is being moved backward by its cam. It is obvious, of course, that the pawl $f^6$ is used only for moving the delivery-block in one direction. For moving it in a reverse direction we use a spring adapted to draw the block back upon the release of the pawls, and after the block has received the last nail from the throat of the machine, to its original or normal position; and the form of construction for accomplishing this purpose which we have shown comprises a drum or wheel, G, mounted upon a stud, $g$, operated by means of the coil-spring $g'$, the end $g^2$ of which is fastened to the drum or wheel G, and the end $g^3$ to a stationary point. This coil is held in a recess, $g^4$, in the case $g^5$. The wheel or drum G is connected with the nail-receiving block by means of the wire or other cord, $g^6$, which extends through the hole $g^7$ in a hinged block in a recess in the frame of the machine, hereinafter described, and is attached to the end of the nail-delivery block, as represented in Figs. 3 and 4. The drum or wheel and its operating devices are secured to the frame of the machine by the bracket $g^8$, so as to bring the upper surface of the drum in line with the recess $g^7$, and so that the pull of the cord shall be straight. The case $g^5$ is cylindrical in form and fits a like recess in the end of the bracket $g^8$, in which it is arranged to revolve. It also has a cap, $g^9$, having a flange, $g^{10}$, which projects upon the side of the bracket-holder, as shown in Fig. 7, and the cap is fastened to the bracket by the screw $g^{11}$. It will be seen that this construction provides a ready means for varying the tension upon the spring, as by withdrawing the screw the case $g^5$ can be revolved in its holder, thereby turning the spring which is attached to its cap, and when a proper degree of tension is obtained the screw $g^{11}$ is replaced. The case $g^5$ also has a hollow post, $g^{12}$, centrally arranged, which receives and holds the spindle $g$, and acts as a support for the coil-spring $g'$.

To automatically stop the machine upon the making of a predetermined number of nails, we have provided the nail-delivering block with a series of holes, $h$, one for each nail-receiving hole of the block, arranged to extend inward from the surface of the dovetailed recess $h'$ on the side of the block, and in this dovetail recess there is arranged to slide the block $h^2$, having the screw-pin $h^3$, adapted to engage or enter any one of said holes and lock the block $h^2$ in place. These holes preferably are numbered from one upward. This block projects from the side of nail receiving and delivery block, so as to come in contact upon the movement of the block with the downward projecting end or shoulder $h^4$ of the link $h^5$. (See Figs. 11 and 26.) This shoulder projects downward in front of the throat of the machine, and the link extends backward to connect at $h^6$ with the lower end, $h^7$, of the trip-lever H. This tripping-lever is pivoted at $h^8$ to the frame of the machine, and has an upward-extending arm, $h^9$, provided with the surfaces H', $h^{10}$, and $h^{11}$, the surface $h^{10}$ being higher than that of the surface $h^{11}$, which, in turn, is higher than the surface H'.

When the machine is set in operation, as hereinafter described, the tripping-lever H occupies the position represented in Fig. 4, and holds the latch $h^{12}$ lifted by means of the push-rod $h^{13}$, the under surface of which has the projection $h^{14}$, which rests upon the surface of the trip-lever, while the pin or rod extends through a hole in the frame of the machine and serves to operate the latch $h^{12}$. These parts are caused to automatically assume this position upon the starting of the machine, as hereinafter described; but in order to stop the machine it is necessary to disengage the driven member of the clutch from the fixed member, and also at the same instant to apply a brake to the fixed member to immediately check the momentum of the parts and stop the machine. The movable member $c$ of the clutch has the collar $H^2$, provided with the groove or recess $h^{15}$, which receives the pins $h^{16}$, projecting inward from the yoke $h^{17}$. This yoke is arranged at the upper end of the lever $h^{18}$, which is pivoted at $h^{19}$, and upon the release or upward movement of the latch $h^{12}$ the spring $h^{20}$ moves the lever inward to bring the driven member of the pulley-clutch in contact with the fixed member and hold it there. The latch $h^{12}$ is in the heel-nailing machine automatically lifted by a cam on the cam-shaft of the heel-nailing machine, (not shown,) and the push rod or bar $h^{21}$, which extends upward through the cavity $h^{22}$ of the post $b'$, and serves to move the block $h^{23}$, which is pivoted at $H^3$. This piece or block in turn moves the rod $h^{24}$, which in turn moves the push rod or pin $h^{13}$, so that at proper intervals of time the cam on the heel-nailing machine, through the connecting mechanism described, serves to lift the latch $h^{12}$. Upon the lifting of this latch the machine is set in operation, and the latch is held lifted, because at the instant it is lifted the tripping-lever H automatically moves into position to support the push-pin $h^{13}$, so that the latch is held lifted by the tripping-lever H. (See Fig. 26.) This brings the end $h^4$ of the link $h^5$ into a position to be moved by the block $h^2$ upon its being brought in contact therewith by the movement of the nail receiving and delivery block, and the time of the movement of this link of course depends upon the position which the block $h^2$ has upon the nail receiving and delivery block.

To cause the machine to deliver two nails, the block $h^2$ will be set so that the pin $h^3$ will register with the hole marked 2, or the second one from the left-hand end of the block. To make fifteen, it will be set so that the spring-pin will register with the hole marked 15, or the fifteenth hole from the left-hand end of the block, and so on. Upon the movement of the nail receiving and delivery blocks, as the nails are made and delivered to it, the block $h^2$ will come in contact with the shoulder or projection $h^4$ of the link $h^5$, and will, after it has received the last-made nail of the series which it is to receive, cause the link to operate the tripping-lever H by moving its upper surface, $h^{10}$, from under the projection $h^{14}$, (see Figs. 1 and 3,) so that the spring $h^{25}$ will immediately move the push pin or rod downward to bring its projection $h^{10}$ to bear on the surface H' of the trip-lever, and the spring $h^{26}$ will immediately draw the latch $h^{12}$ downward, so that its shoulder $h^{27}$ shall be in line with the solid portion of the lever $c^{13}$, and this lever upon the backward movement of its upper part will positively disengage the driven member of the clutch from the fixed member, and at the same time cause the friction-pad K, which is supported by the arm $k$ of the lever $h^{18}$, to be forced in contact with the side of the fixed member of the clutch, and thus at once stop the machine. It will be noticed that the end of the latch $h^{12}$ projects into the recess formed in the lever $c^{13}$, and that during the making of the nails the latch is held lifted, so that the lever cannot come in contact with the shoulder $h^{27}$ of the latch, and that it is only upon the downward movement of the latch that the lever comes in contact with the shoulder; also, that this downward movement is so timed as to take place when the upper part of the lever has been moved forward, so that it serves to push the latch upon its backward movement. The latch, it will be observed, is pivoted to the arm $k$ of the lever $h^{18}$, so that it moves with it.

We would not be understood as confining ourselves to the especial form of construction of parts connecting the cam of the heel-nailing machine with the latch $h^{12}$ or with the push-pin $h^{13}$, as they may be in one piece, if desired, instead of in three parts. When, however, the receiving and delivery block has a sliding hole-covering plate, such as is hereinafter described, I prefer to use the pivoted block $h^{23}$, as it then serves not only to communicate motion to the push-pin, but also as an abutment, against which the covering-plate comes in contact upon the backward movement of the nail receiving and delivery block, and is thereby caused to hold it stationary; but upon the upward movement of the end of the block $h^{23}$, upon the starting of the machine, the end or part $H^4$, against which the hole-covering plate is brought in contact, is lifted, and the spring actuating the covering-plate is allowed to act to move the covering-plate to close the holes in the nail receiving and delivery block before the block is moved forward.

The movement of the link $h^5$ to stop the machine also serves another purpose, and that is to lift the detent and feed pawls and hold them lifted while the nail-receiving block is being moved back, and this result is obtained by providing the detent-pawl with a projection, $m$, which extends over the link $h^5$, but which does not come in contact therewith when the link is substantially horizontal, but only when it has been moved by the block $h^2$ to operate the tripping-lever H. The link is inclined, as represented in Fig. 1, and its upper surface comes in contact with the projection $m$ and lifts the detent-pawl from engagement with the teeth of the nail-carrier block. This upward movement of the detent-pawl also causes the upward movement of the feed-pawl, because the feed-pawl is provided with a pin or projection, $m'$, which extends over the detent-pawl in such a manner that upon the lifting of the detent-pawl by the link $h^5$ the feed-pawl is lifted from engagement with the teeth of the nail-receiving block. It will be seen, further, that upon contact of the block $h^2$ with the arm $h^4$ of the link, the lever H is not only tripped, but by the immediate downward movement of the push-pin $h^{13}$ the projection $h^{14}$ thereon shuts upon the lower surface, H', of the tripping-lever and holds it locked in that position, so that immediately upon the tripping of the trip-lever H the machine is stopped, the detent pawl and feed-pawl disengaged and held lifted, while the nail-receiving block is being moved automatically backward. Not only this, but these parts are held in this position until the machine is again started. If it is desired to stop the machine, but not permit the nail receiving and delivery block to be moved backward, then the link $h^5$ may be used to operate the tripping-lever, so as to bring the projection $h^{14}$ of the push-pin on the surface $h^{11}$ of the tripping-lever. Upon the backward movement of the nail receiving and delivery block the end N of the sliding plate N', which projects, as represented in Fig. 4, comes in contact with the shoulder $H^4$, and is held thereby, as above described. This brings its holes in register with the holes of the block $f^2$ of the nail-distributer, while the spring-actuated roll or wheel G draws the block F back until it comes in contact with the said shoulder $H^4$ and the shoulder $n'$, which brings its holes in register with the holes of the sliding covering-plate and the holes of the said block $f^2$, when the nails are free to drop from the nail receiving and delivery block.

To lock the nail receiving and delivery block automatically in place when it has reached the end of its backward movement, we have arranged a latch, $n^2$, which is pivoted to the cross-piece $b^{10}$ of the frame at $n^3$. (See Figs. 4 and 9.) It has a downward-extending projection or tooth, $n^4$, and the extension $n^5$, which bears upon the roll $n^6$ of the movable piece, $h^{23}$. The projection or tooth $n^4$ is adapted to close automatically into a notch or recess, $n^7$, on the shoulder $f^3$ of the nail receiving and delivery block when it has been brought in line with the tooth $n^4$ upon its backward movement; and the tooth is moved automatically into place by means of the spring $n^8$, (see Fig. 4,) which bears upon the upper surface of the lever.

In starting the machine the upward movement of the block $h^{23}$ causes the latch $n^2$ to be lifted sufficiently to disengage the tooth $n^4$ from the notch $n^7$ before the nail receiving and delivery block is started.

The machine is so timed that upon the lifting of the latch $h^{12}$ the trip-lever H immediately assumes the position shown in Fig. 4, and this permits the feed and detent pawls to immediately drop, so that before the shaft has revolved sufficiently to move the feed-pawl, the feed-pawl has become engaged with the first tooth of the nail-carrying block.

The nail-carrier supports the cam or pattern $e^{25}$, for automatically varying the length of nails, the said pattern or cam being secured thereto upon the back side thereof by means of screws, or in any other desirable way, and so as to be removable therefrom. Of course different patterns or cams are used, according as it is desired to change or vary the length of nail automatically.

The nail-distributer is well shown in Figs. 1, 3, 4, 19, and 29, and it comprises the upper block or plate, $f^2$, which is made long and narrow, and has holes $o$ extending through it, arranged to correspond in location with the holes in the nail receiving and delivery block. These holes are enlarged on the under side of the block to receive the ends of the tubes $o'$, which connect the holes in the block with the holes $o^2$ in the plate $o^3$, which holes have any arrangement desired, and for heel-nailing the plate has the holes arranged in the form or order in which the nails are driven into the heel. These holes are enlarged at their upper ends to receive the lower ends of the connecting-tubes. These three parts—namely, the upper block, the tubes, and the lower plate—comprise the nail-distributer, and they are secured together and made removable from the machine in order that other distributers having a greater or less capacity may be substituted.

In order to protect the tubes, and to strengthen the construction, we have formed two aprons or plates, $o^4 o^5$, which are shaped to inclose the tubes and secure the upper block and lower plate together. Each of these protecting plates or aprons has a shoulder, $o^6$, which fits under the under surface of the upper block, and a flange, $o^7$, which extends along its side, by which they are fastened together by means of screws or bolts $o^8$, as represented in Fig. 6. The aprons or plates also have lugs $o^9$ for the reception of fastening-screws, and their lower edges are thickened and rest upon the upper surface of the lower plate, $o^3$, and screws $o^{10}$ pass upward through the plate into the aprons and serve to fasten the parts rigidly thereto. The lower plate, $o^3$, also has a dovetail recess, $o^{11}$, in its under surface for the reception of the sliding plate $o^{12}$, and this plate is provided with perforations to correspond with the holes $o^2$ in the plate, and it is adapted to be moved to bring its holes in register with the holes in the plate and in the nail-carrier by the pin $o^{13}$ on the nail-carrier plate. It is closed automatically by the spring pin or block $o^{14}$, which is carried by the hinged bar $o^{15}$, and comprises a pin having the enlarged inner end, and a coil-spring which surrounds it and forces the end inward, as represented in Fig. 6. The upper cross-plate, $b^6$, is cut out to receive the upper block of the nail-distributer, and the lower cross-plate, $b^2$, is provided with a recess to receive the lower block of the distributer, as represented in Fig. 4, and the distributer is held in place by the locking-screws $o^{16}$, which screw into the upper cross-plate, $b^6$, and the hinged bar $o^{15}$, which carries the spring-operated pin, is pivoted at X to swing horizontally, and is fastened in place by the screw $o^{17}$.

It will be seen that as the nail receiving and delivery block is always started from one position the first holes thereof are the holes which are always used for receiving the nails, and consequently the first holes are much more used than the last holes of the block; consequently it is necessary in making the distributers to arrange the connecting-tubes so that the first holes or the holes first in order on the upper block, $b^2$, shall be first connected with the holes of the lower plate. This upper block of the distributer is of course provided with the same number of holes as the nail receiving and delivery block; but in making the distributer the holes in the lower block govern the number of connections with the holes of the upper block. For instance, if the lower block is arranged to deliver fifteen nails it will have fifteen holes, and the fifteen holes of the block must be connected with the first fifteen holes of the upper block, as represented in Fig. 4, and the remaining holes of the block $f^2$ will not be connected. Of course in using this distributer the machine will be set to make and deliver only fifteen nails. If more nails are to be delivered, the distributer is removed and another one substituted having the necessary number of holes in the lower block, and tubes connecting them with the holes in the upper block. All the tubes connecting with the upper block, however, are always arranged to begin with the first hole in order. This necessitates that the tubes be bent and arranged to connect the two blocks, substantially as shown in Figs. 3, 4, and 6.

It will be seen that by securing the spring-pin to the hinged latch or arm $o^{15}$ only one device for closing the sliding covering-plates of the various distributers which may be used is necessary.

In the operation of the machine as forming a part of and used in connection with a heel-nailing machine, the boot or shoe to be nailed is placed upon a jack and the jack brought into position beneath the templet-plate. The heel-blank is placed in position upon the sole, either by hand or automatically, and if the top-lift is not automatically fed it is placed in the top-lift holder upon the spanker. The machine is then set in operation. The first reciprocation of the cross-head compresses the heel-blank upon the sole and forms holes therein. The nail-carrier, which has previously been loaded with nails, is then moved forward and delivers its nails into the templet-holes. The second reciprocation of the cross-head then takes place, driving the nails into the heel. The nail-carrier is then moved backward under the distributer, and upon its backward movement the pin on the nail-carrier plate moves the covering-plate $o^{12}$, uncovering the holes in the plate $o^3$, and allowing the nails which have been previously made to drop therefrom into the nail-carrier. The nail-carrier is then moved forward or advanced sufficiently to enable the covering-plate $o^{12}$ to be moved back into position to cover the holes in the nail-holder plate, and at this instant the cam of the heel-nailing machine operates to unlatch the latch $h^{12}$, thereby automatically setting the nail-making machine into immediate operation. Meanwhile the third reciprocation of the cross-head applies and spanks on the top-lift, and a fourth reciprocation breasts the heel. The nail-making machine continues to run from the time it is started until the requisite number of nails have been made and distributed, when it is automatically stopped. This stopping occurs, generally, immediately after the stopping of the heel-nailing machine, but of course it depends somewhat on the number of nails made. Before the machine is set in operation the distributer, arranged to deliver the desired number of nails, is placed in the nail-making machine, and if the nails are to vary in length the cam or pattern of the desired form is placed upon the nail-carrying block, and the device for varying the length of nail set to approximate the average length of the nail desired.

It will be seen that in the operation of the machine only three adjustments or operations are necessary for the purpose of obtaining nails of any length or any number and a delivery in any former arrangement. The adjustment as to length is obtained simply by turning the knob or arm $e^{20}$. The adjustment to effect the automatic variation of length is obtained by attaching to the nail-block a pattern or cam-plate. The number of nails desired is obtained by simply moving the block $h^2$ on the nail receiving and delivery block, and the difference in the arrangement of nails is accomplished by substituting one distributer for another.

It will be observed that in the operation of the machine it is not necessary that the plate $o^3$ be provided with a sliding hole-covering plate, as the operation of the nail-carrier may be so timed as to be moved back into position to receive the nails as they are dropped from the nail receiving and delivery block, and the nail making and distributing machine then put in operation, the nail receiving and delivery block provided with a load of nails which are automatically deposited, when a sufficient number have been made, into the tubes of the distributer to fall directly into the holes in the nail-carrier.

It will be seen that in the starting of the nail-making machine and distributing-machine the first operation is to release the covering-plate of the nail receiving and delivery block, to unlatch or unlock the said block, to release the detent and feed pawls, and to then make and deliver a nail into the first hole of the nail-receiving block; that the feed-pawl then operates to advance the nail receiving and delivery block to bring the next hole therein in register with the throat of the machine, and that the detent-pawl then holds it locked in that position while the feed-pawl is moved back to engage the next tooth in order; but in no event does the feed-pawl operate to feed the block until the nail has been severed from the wire and the wire advanced by the feed-roll to force the nail from the throat into the hole in the nail-receiving block waiting to receive it.

We would state that the devices herein described or parts thereof may be used in connection with nail-driving devices for driving separate nails in succession; also, that the machine may be used for making and feeding nails for sole-nailing machines, such as described in Patent No. 322,562, to Raymond, or for box-nailing machines, or for any other purpose where it is desired to make nails and deliver them in a group or gang for simultaneous driving.

It is obvious that the nail receiving and delivery block may be used in connection with any nail making or distributing machine or device having a throat, through which nails are delivered singly to receive nails therefrom, one by one, and to deliver them to nail-distributing tubes or passages.

It is of course obvious that the form of distributer shown is adapted simply for heel-nailing machines, and that for other purposes its form and the arrangement of its passages would be changed to meet the necessary requirements, and that said change in form would simply consist in connecting the holes of the upper block of the distributer with such parts of the nail-driving machine as might be desired.

We would further state that we do not confine ourselves to the special form of operating the nail-receiving block herein shown and described.

The plates $o^4$ $o^5$ of the nail-distributer not only serve to protect the tubes from injury, but also to give solidity to the distributer, and to hold the lower plate in proper relation to the block, and by means of lateral projections $z'$ at the lower edges thereof, which are arranged to lap upon the cross-plate $b^2$ of the frame, to register and support the distributer when in operative position.

It will be seen that the nail receiving and delivery block is moved upon the block $f^2$, and upon a portion of the upper cross-plate, $b^6$, of the frame for a portion of its travel, and that for the remainder of its movement it travels upon the upper surface, $z^2$, of the bracket $z^3$ through a hole, $z^4$, formed in the base of the upper part of the frame-work.

Having thus fully described our invention, we claim and desire to secure by Letters Patent of the United States—

1. The combination of a feedway, $c^8$, the movable block $c^{12}$, having the throat $c^{11}$, and nozzle movable in relation to the feedway, as described, and the reciprocating cutters D D', all substantially as and for the purposes set forth.

2. The combination of the feedway $c^8$, the block $c^{12}$, having the throat $c^{11}$, provided with the movements in relation to the feedway specified, with the cutters D D', and the wire-feeding devices, all substantially as described.

3. The combination of the feedway $c^8$, the movable block $c^{12}$, having the throat $c^{11}$, the cutters D D', and devices for reciprocating the cutters, and for moving the block $c^{12}$ out of and into line with the feedway during the forward movement of the cutters and immediately after they have operated upon the wire, all substantially as and for the purposes described.

4. The combination of the feedway $c^8$, the movable block $c^{12}$, having the throat $c^{11}$, the reciprocating cutters D D', the wire-feeding devices, and means for varying the time of operation of said feeding devices, whereby the extent or length of wire fed to the cutters may be varied, all substantially as and for the purposes described.

5. The combination of the feedway $c^8$, the plates or pieces $d^4$, forming a hole making a portion of the feedway, and a V-shaped downward-extending section, with the reciprocating cutters D D', and the escape-passage $d^2$, all substantially as and for the purposes described.

6. The combination of the block $c^{10}$, having the guideway $d$, the plates $d^4$, forming a hole in extension of the feedway, the cutters D D', their holding-block $d'$, the cam $c^2$, lever $c^{13}$, and link $c^{15}$, all substantially as described.

7. The combination of the block $c^{10}$, having the guideway $d$, the plates $d^4$, forming a hole in extension of the feedway, the reciprocating cutter-holder block $d'$, the cutters D D', the block $c^{12}$, having the throat $c^{11}$, and devices connecting it with the block $d'$, whereby the block $c^{12}$ is caused to be moved during a portion of the movement of the cutters, all substantially as described.

8. The block $c^{12}$, having a stud or post, $c^{17}$, in which is located or arranged the eccentric throat $c^{11}$, the cutters D D', and means for turning or partially revolving the post, all substantially as described.

9. The combination of the block $c^{12}$, having the post $c^{17}$, throat $c^{11}$, and plate $c^{24}$, having the cam-slot $c^{23}$ $c^{25}$, with the reciprocating cam-pin $c^{22}$, adapted to engage with said cam-slot, all substantially as and for the purposes described.

10. The combination of the block $c^{12}$, having the throat $c^{11}$, with the spring-holding pin or block $c^{26}$, adapted to be automatically moved into the throat of the machine, all substantially as described.

11. The combination of the feedway and reciprocating cutters, the feed-rolls $c^4$, the feed-roll $c^7$, its holding or supporting spring $e^3$, the block $e^{10}$, having the surfaces $e^{12}$ $e^{13}$, with the cam $c^3$, levers $e^6$ $e^8$, and link $e^{11}$, substantially as described.

12. As a means for varying the range of reciprocation of a feed adjusting or varying block, a lever, $e^6$, operated by a cam, and a bent lever, $e^8$, connected at one end with said block, and at the other end with a device for varying its position in relation to the operating-lever $e^6$, all substantially as described.

13. The combination of the lever $e^6$, pivoted as described, with the bent lever $e^8$, the disk $e^{18}$, having the perforations $e^{19}$, and the arm or knob $e^{20}$, mounted on the eccentric pin, for adjusting the lever $e^8$, and having a pin or projection for engaging the holes $e^{19}$, all substantially as described.

14. The combination of the arm or lever $e^3$ of a wire-feeding device, the reciprocating block $e^{10}$, having the surface $e^{12}$ $e^{13}$, and the hinged arm $e^{16}$, having the surface $e^{14}$ $e^{15}$, and interposed between the block $e^{10}$ and said lever $e^3$, all substantially as described.

15. The combination of the arm or lever of the wire-feeding mechanism, the block $e^{16}$, hinged to an arm or support and adapted to bear against the said arm or lever $e^3$, and provided with the surface $e^{14}$ $e^{15}$, with the reciprocating block $e^{10}$, having the surface $e^{12}$ $e^{13}$, all substantially as described.

16. The combination of the reciprocating block $e^{10}$, having the surface $e^{12}$ $e^{13}$, with a block, $e^{16}$, interposed between the said block $e^{10}$ and the lever or arm $e^3$ for bringing into operation the feeding mechanism, with a cam or pattern for varying the vertical position of the block $e^{16}$, all substantially as described.

17. The combination of the block $e^{16}$, having the surface $e^{14}$ $e^{15}$, and supported by the movable bar $e^{17}$, with a cam, $e^{25}$, for varying the vertical movement of said bar and the position of said block, all substantially as described.

18. The combination of the block $e^{16}$, shaped as described, its vertically-movable supporting-bar $e^{17}$, spring $e^{28}$, and the cam $e^{25}$, all substantially as described.

19. The combination of devices for making nails from wire and delivering them successively from the throat or nozzle with a traveling block having a series of nail receiving and holding holes arranged therein upon a straight line, which are adapted to be brought successively into position beneath the throat or nozzle to receive the nails delivered therefrom, all substantially as and for the purposes described.

20. The combination of a throat or passage, through which nails are delivered in successive order, with a movable nail receiving and delivery block having a series of nail-receiving holes adapted to be moved successively into position beneath the throat or nozzle to receive nails in successive order therefrom, and a device for closing said holes while the nails are being received and carried by said block, all substantially as described.

21. In a nail making and distributing machine, a traveling nail receiving and delivery block having a series of holes therein arranged at a uniform distance apart, and a movable or sliding covering-plate for closing and opening the said holes, substantially as described.

22. The combination of the throat or nail-distributing passage, through which nails are adapted to be fed in successive order, with a nail receiving and delivery block, F, having the series of holes $f$, and a covering-plate, the teeth, and a reciprocating feed-pawl for moving the block to bring the holes successively in line with the holes of the throat, substantially as described.

23. The combination of a throat, through which nails are adapted to be delivered in successive order, a traveling nail receiving and delivery block, and a reciprocating feed-pawl for moving the block to bring the holes successively in line with the throat, and a detent pawl for successively locking the block stationary after the operation of the feed-pawl, all substantially as described.

24. The combination of a throat, through which nails are adapted to be delivered singly in successive order, a nail receiving and delivery block, a feed-pawl for intermittingly moving it in one direction, a detent for locking it at the end of each intermittent movement, and means for moving the block in a reverse direction to restore it to its normal position upon the release of the detent, all substantially as described.

25. The combination of a throat adapted to deliver nails singly in successive order, a nail receiving and delivery block, a feed-pawl for intermittingly moving the same to bring its holes in successive order beneath the throat, a detent for holding the said block at the end of each feed movement of the pawl, and a tripping device for automatically releasing the detent to permit the movement of the block in a reverse direction, all substantially as described.

26. The combination of a throat, through which nails are adapted to be fed in successive order, a nail receiving and delivery block having a series of nail-receiving holes, an intermittent-feeding device, and an intermittingly-actuated detent, with stop-motion mechanism for disengaging the driving member of the clutch from the driven member, and a tripping device adapted to release the detent and at the same instant to cause the operation of the stop-motion mechanism, all substantially as described.

27. The combination of a nail receiving and delivery block having nail-receiving holes, an intermittent-feeding device for advancing the block by successive impulses in one direction, the detent or lock for locking the block at the end of each forward movement, the tripping mechanism, and an adjustable block carried by the nail receiving and delivery block for operating the tripping mechanism, all substantially as described.

28. The combination of a nail receiving and delivery block adapted to be moved in two directions and a tripping device for automatically tripping the mechanism for moving it in one direction, in order to permit the mechanism moving it in the opposite direction to operate to move the block, all substantially as described.

29. The combination of the nail receiving and delivery block, having a series of holes for the reception of the nails, with a tripping-block arranged to be horizontally adjustable thereon, all substantially as described.

30. The combination of the nail receiving and delivery block with the spring-actuated wheel or drum G and the connecting wire or rod $g^6$, substantially as described.

31. The combination of a movable nail receiving and delivery block, the driving and driven members of a clutch, the stop-motion device, and a tripping mechanism for automatically tripping the stop-motion device and permitting it to operate, all substantially as described.

32. The combination of the traveling nail receiving and delivery block with a stop for limiting the extent of its backward movement, substantially as described.

33. The combination of the traveling nail receiving and delivery block, means for moving it to its normal position, and a latch or lock for automatically latching or locking it at the end of said movement, substantially as described.

34. The combination of a nail receiving and delivery block having a series of nail-receiving holes arranged in straight lines therein and provided with a feed-motion, substantially as described, a sliding hole-covering plate, N, carried by said block, and a stationary stop for automatically moving the sliding plate to uncover the holes in the nail receiving and delivery block at the end of the movement of the block, all substantially as set forth.

35. The combination of a nail receiving and delivery block having a series of nail receiving and holding holes with the sliding hole-covering plate N, having an upward extension at one end thereof, and a spring, $f^9$, interposed between said upward extension and a shoulder of the nail receiving and delivery block, substantially as described.

36. The combination of the nail receiving and delivery block F, the nail-regulating block $h^2$, the fast member $c'$ of the clutch, the movable pad K, the latch $h^{12}$, the cam $c^2$, the lever $c^{13}$, the push-pin $h^{13}$, the tripping-lever H, and the link $h^4$ $h^5$, all substantially as described.

37. The combination of the fast member $c'$ of the pulley-clutch, the movable friction-pad K, the latch $h^{12}$, the lever $c^{13}$, and the cam $c^2$, substantially as described.

38. The combination of the link, operated as described, adapted to be moved from a straight to an inclined position by the contact of the movable block $h^2$ therewith, with the detent-pawl and feed-pawl arranged to be lifted or moved vertically by said link, all substantially as described.

39. The combination of the fast member $c'$ of the clutch, the driven member $c$ of the clutch, the lever $h$, the spring $h^{20}$, the friction-pad K, the latch $h^{12}$, operated by a cam, and device for automatically lifting the latch and holding it lifted, substantially as described.

40. The combination of the nail receiving and delivery block, the spring-actuated sliding bottom plate, the stop $n$, and means for automatically moving it from engagement with the sliding plate before the beginning of the feed movement of the nail receiving and delivery block, whereby the holes of the block are automatically closed before the block is started forward, all substantially as described.

41. The combination of the nail receiving and delivery block, its locking or latching mechanism, and means for automatically unlatching or unlocking the said latching or locking device before the feeding mechanism is actuated, all substantially as and for the purposes described.

42. The combination of a nail receiving and delivery block having holes for the reception of nails, a sliding hole-covering plate, a latching or locking device for holding the block locked or latched in its normal position, and intermittent-feeding mechanism, and a cam and connecting devices for automatically moving the stop $n$, to permit the closing movement of the sliding hole-covering plate and unlatching or unlocking said block before the starting of the feeding devices, all substantially as described.

43. The combination of the push-pin $h^{13}$, having the projection $h^{14}$, with the tripping-lever H, having the surfaces $h^{10}$, $h^{11}$, and H', all substantially as described.

44. The combination of a block having the waste-escape passage $d^2$, and the post $b$, having the hole $d^3$, with which said escape-passage connects, all substantially as described.

45. The nail-distributer comprising the perforated block $f^2$, having holes corresponding in number and arrangement with the holes in the nail receiving and delivery block, the tubes $o'$, in number corresponding with the number of nails to be delivered, and arranged to connect the holes of the block $f^2$, beginning at one end thereof, and for such number of nails as may be needed, with the block $o^3$, and said block $o^3$, substantially as described.

46. The nail-distributer comprising the perforated plate $f^2$, the tubes $o'$, the plate $o^3$, and an incasing jacket or shell for protecting the tubes, all substantially as described.

47. The combination of the perforated plate $f^2$, the tubes $o'$, the plate $o^3$, and a connecting casing or shell adapted to inclose the tubes, and to fasten or secure the block $f^2$ and plate $o^3$ together, substantially as described.

48. The combination, in a nail-distributer, of the perforated block $f^2$, the tubes $o'$, the plate $o^3$, casings $o^4$ $o^5$, having the shoulders $o^6$, flanges $o^7$, and screws or bolts for fastening the two sections of the casing to the said block and plate, all substantially as described.

49. The combination of the cross-plate $b^6$, the plate $b^2$, and recesses for the reception of the upper and lower parts of the distributer, with devices for locking the distributer thereto, all substantially as described.

50. The combination of the plate $b^6$, the plate $b^2$, the distributer, and the screws $o^{16}$, all substantially as described.

51. The combination of the plate $b^2$, recessed to receive the distributer, with the hinged bar $o^{15}$ and screw $o^{17}$, substantially as described.

52. The combination of the distributer and the sliding bottom plate, $o^{12}$, with a hinged bar, $o^{15}$, and a spring-operated push-block, $o^{14}$, substantially as specified, adapted to move the sliding plate, as described.

53. The combination of a throat for delivering fastenings to a nail receiving and delivery block, said nail receiving and delivery block having a series of holes for receiving and holding nails adapted to be moved to bring the holes in successive order to the throat, and to be moved in a reverse direction to a position to deliver the nails thus received, with the perforated block $f^2$ and distributing-tubes $o'$, substantially as described.

54. The combination of devices for making nails from wire and delivering them in succession to a nail receiving and delivery block, said nail receiving and delivery block having a series of holes for receiving and holding said nails, and having an intermittent movement in one direction, as specified, with the block $f^2$ and tubes $o'$, substantially as described.

55. The combination, in a nail making and distributing machine, of the following instrumentalities: devices for making nails and delivering them in successive order to a nail receiving and delivery block, a nail receiving and delivery block intermittently moved in one direction to receive the nails and in a reverse direction to deliver them, a nail-distributer, an automatic start-motion and an automatic stop mechanism, all substantially as described.

56. The combination of devices for making nails and delivering them in successive order to a nail receiving and delivery block, said nail receiving and delivery block having an intermittent movement in one direction and mechanism for moving it in a reverse direction, a nail-distributer, and a tripping mechanism for tripping the nail receiving and delivery block feeding devices upon the making and delivery to the block of a predetermined number of nails, all substantially as described.

57. The combination of devices for making nails and delivering them in successive order to a reciprocating nail receiving and delivery block, said reciprocating nail receiving and delivery block moved intermittently in one direction and continuously in the reverse direction, the nail-distributer, and automatic tripping mechanism for automatically operating the stop-motion mechanism upon the completion and delivery to the nail receiving and delivery block of a predetermined number of nails, whereby the nail-making machine is automatically stopped, and the nail receiving and delivery block released after it has received the last nail made, all substantially as and for the purposes described.

58. The combination, in a nail making and distributing machine, of devices for delivering nails in successive order to a movable nail receiving and delivery block, said nail receiving and delivery block adapted to be moved in both directions, substantially as described.

59. The combination nail-distributer arranged to receive nails at the end of a movement of said block, a lock or latch for automatically locking or latching said block at the end of the said movement, a device for automatically opening the holes of said block, a stop-motion mechanism, and a start-motion mechanism, and means for automatically unlatching or unlocking the nail receiving and delivery block and releasing the covering-plate thereof before the first nail is delivered or the block moved, all substantially as described.

60. The combination of the tripping-lever H, the link $h^6$, the detent-pawl $f^{16}$, the feed-pawl $f^6$, and devices for automatically unlatching the tripping-lever, whereby the detent and feed pawls are automatically allowed to take an operative position upon the starting of the nail-making machine, all substantially as and for the purposes described.

61. The combination of a throat or nozzle, through which fastenings are adapted to be delivered successively, a traveling nail receiving and delivery block having the ratchet-teeth $f^5$, the feed-pawl $f^6$, and means for tripping the same or removing it from contact with the teeth and holding it so removed during the reverse movement of the nail receiving and delivery block, all substantially as described.

62. The combination of the traveling block F, the detent or lock, and means for tripping it or removing it from engagement with the teeth and holding it lifted during the continuous movement of the block in one direction, all substantially as described.

63. The combination of the block F, having the teeth $f^5$, the detent-pawl, the feed-pawl, and a connecting device whereby the disengagement of the detent from the teeth $f^5$ causes the disengagement or tripping of the feed-pawl, all substantially as described.

64. The combination of the cam $e^3$, the wire-feeding devices, the traveling block F, and connecting mechanism whereby the same cam operates the wire-feeding devices, and also the nail receiving and delivery block, all substantially as described.

65. The combination of the cam $c^2$, the wire pointing and severing devices, and the stop-motion mechanism and connecting devices, whereby the same cam serves to operate the nail-severing devices and to stop the machine, all substantially as described.

66. The combination of the block F, the wheel or drum G, the cord $g^6$, and the spring $g'$, substantially as described.

67. The combination of a block moving the drum or wheel G, the casing $g^9$, the holder $g^8$, and the spring $g'$, fastened at one end to the casing $g^9$ and at the other end to the drum or wheel G, substantially as described.

68. The combination of the drum or wheel G, adapted to move the nail receiving and delivery block, the casing $g^9$, having the recess $g^4$ and flange $g^{10}$, a bracket, $g^8$, supporting the same, the spring $g'$, secured to the drum or wheel of the casing, and the locking-screw $g^{11}$, all substantially as described.

69. The combination of the block-moving drum or wheel G, for moving the nail receiving and delivery block, the casing $g^9$, having the sleeve $g^{12}$ and recess $g^7$, the bracket-holder $g^8$, and the spring $g^3$, surrounding said sleeve or post $g^{12}$, and secured to the casing and to the drum or wheel, all substantially as described.

70. The nail receiving and delivery block F, having the nail-receiving holes $h$ and the ratchet-teeth $f^5$, all substantially as described.

71. The nail receiving and delivery block F, having the holes $h$, and the block $h^2$, having a stud or pin adapted to enter said hole, to secure said block $h^2$ to the nail receiving and delivery block, and provided with the adjustment thereon, all substantially as described.

72. The nail receiving and delivery block F, having a recess in its under surface and a sliding hole-covering plate adapted to be moved in said recess, all substantially as and for the purposes described.

73. The combination of the nail receiving and delivery block F, having the shoulders or flanges $f^3$ and cap-plates $f^4$, substantially as described.

74. The combination of the block $f^2$, having the perforations or holes $o$, enlarged at their lower ends to receive the upper ends of the tubes $o'$, with said tubes and the plate $o^3$, having the holes $o^2$, enlarged at their upper ends to receive the ends of the tubes, all substantially as described.

75. A nail-distributer having a series of passages or tubes for receiving and distributing nails, with a protecting jacket or casing for surrounding them in whole or in part, all substantially as described.

76. The nail distributer comprising the perforated block $f^2$, the distributing-tubes $o'$, perforated plate $o^3$, and one or more plates connecting the block $f^2$ and plate $o^3$, said plate or plates having the shoulder or shoulders $o^6$, and a projection extending laterally at its lower edge beyond the plate $o^3$, all substantially as and for the purposes described.

77. The combination of the traveling nail receiving and delivery block F with the block $f^2$, the cross-plate $b^6$, and the bracket $z^3$, having the surface $z^2$, all substantially as described.

ALBERT O. TOWNS.
FREEBORN F. RAYMOND, 2D.

Witnesses:
FRED. B. DOLAN,
J. M. DOLAN.